US012633800B2

(12) United States Patent
Wang

(10) Patent No.: US 12,633,800 B2
(45) Date of Patent: May 19, 2026

(54) MAGNETIC ROTATING MECHANISM

(71) Applicant: Wade-Lee Wang, New Taipei City (TW)

(72) Inventor: Wade-Lee Wang, New Taipei City (TW)

( * ) Notice: Subject to any disclaimer, the term of this patent is extended or adjusted under 35 U.S.C. 154(b) by 222 days.

(21) Appl. No.: 18/679,490

(22) Filed: May 31, 2024

(65) Prior Publication Data

US 2025/0373115 A1 Dec. 4, 2025

(51) Int. Cl.
*H02K 7/02* (2006.01)
*H02K 7/18* (2006.01)
*F03G 3/08* (2006.01)

(52) U.S. Cl.
CPC ............. *H02K 7/025* (2013.01); *H02K 7/183* (2013.01); *F03G 3/08* (2013.01)

(58) Field of Classification Search
CPC ... C12Q 1/6886; C12Q 2600/154; F03G 3/08; H02K 7/025; H02K 7/183; H02K 7/00; H02K 7/04; H02K 7/02; H02K 7/003; H02K 7/006; H02K 7/18; H02K 7/1807
See application file for complete search history.

(56) References Cited

U.S. PATENT DOCUMENTS

2010/0079023 A1* 4/2010 Jang ........................ H02K 53/00
310/152

FOREIGN PATENT DOCUMENTS

WO WO-2010135032 A1 * 11/2010 ............. F03D 3/005

OTHER PUBLICATIONS

WO-2010135032-A1, all pages (Year: 2010).*

* cited by examiner

*Primary Examiner* — Naishadh N Desai
(74) *Attorney, Agent, or Firm* — WPAT, PC

(57) ABSTRACT

A magnetic rotating mechanism has at least one layer structure. Each layer structure has at least one rotating arm (4), at least one securing base (14), a rotating axle (2), a top board (17), and a bottom board (15). The at least one rotating arm (4) is located between the top board (17) and the bottom board (15). The at least one securing base (14) is mounted on the bottom board (15). At least one permanent magnet is mounted on each one of the rotating arm (4) and the securing base (14). The permanent magnet on each rotating arm (4) has a magnetic pole direction parallel to the diameter direction of the rotating circle, and the permanent magnet on each securing base (14) has a magnetic pole direction parallel with an axle direction of the rotating axle (2).

9 Claims, 6 Drawing Sheets

MAGNETIC ROTATING MECHANISM

1. FIELD OF THE INVENTION

The present invention relates to a magnetic rotating mechanism driven by wind, and more particularly to a magnetic rotating mechanism for improving a stability of the rotation of a wind power generator and for decreasing a chance of stop of blades of the wind power generator.

2. DESCRIPTION OF RELATED ART

Winds in many areas are intermittent, and wind strengths in each area are also different. Because the wind strengths in each area are different and even no wind occurs, the kinetic energy inputted to a rotator is discontinue to cause instability of the output of a generator.

The winds on a land blow on after another (blow for a while and stop for a while), some datum show that the power generation of a wind power generator is lower then 20% of the device capacity in 180 days of 365 days. Who to improve the power generation of the wind power generation is an issue worth to be studied.

A wind power generation is a process of transforming a wind power to an electric power. The design of a conventional wind power generator is a generation devein by wind directly to rotate and to generate electric power, or the wind drives the flywheel energy storage mechanism and then generates electricity indirectly.

However, the convention flywheel energy storage mechanism has disadvantages of low energy density, high cost of maintaining, and low cost-effectiveness, so the flywheel energy storage mechanisms are rarely used in a wind power generator.

A wind turbine blade with a large radius and heavy weight needs a strong wind to drive it from a standstill. If it is in a rotating state, it can be driven by only weak wind force. If it can be allowed to maintain a more stable rotation, the minimum wind force requirement can be reduced.

However, after a strong wind occurs, another strong wind will occur after waiting for some time. For instance, a strong wind, a breeze, a breeze, a breeze, a breeze, a strong wind, a breeze, and a breeze occur, the first strong wind actuates the heavy blades to rotate, the blades will be slowed down and even stop due to resistance, the blades will be actuated to rotate when the next strong wind occurs.

The conventional magnetic rotating mechanism is often difficult to achieve a low rotation resistance due to the attraction and repulsion between N-S magnetic poles.

To overcome the shortcomings, the present invention tends to provide a magnetic rotating mechanism to mitigate or obviate the aforementioned problems.

The main objective of the invention is to provide a magnetic rotating mechanism with a low rotational resistance to assist intermittent wind force. This allows the shaft of the wind turbine to rotate stably.

The instantaneous wind force drives the permanent magnets in the mechanism to start rotating, which contains magnetic force, thus combining the wind force and magnetic force to stabilize the rotation of the mechanism.

To achieve the objective of the invention, the present invention provides a magnetic rotating mechanism comprising at least one layer structure. Each one of the at least one layer structure has at least one rotating arm, at least one securing base, a connection board, a rotating axle, a top board, and a bottom board. The connection board is located between the top board and the bottom board and connected securely to the rotating axle. The at least one rotating arm is mounted on the connection board. The at least one securing base is mounted on the bottom board. At least one permanent magnet is mounted on each one of the at least one rotating arm and the at least one securing base. The magnetic pole direction of each permanent magnet on each rotating arm is parallel to the diameter direction of the rotating circle, and each permanent magnet on each one of the securing base has a magnetic pole direction parallel with an axle direction of the rotating axle.

With the aforementioned feature, the magnetic rotating mechanism has a lower rotating resist by the arrangements of the rotating arms, securing bases, distances there between, arrangement ranges thereof, and width ranges thereof. The mechanism can be rotated for a while after an instantaneous wind force.

In addition, with the magnetic rotating mechanism is mounted inside a wind power generator, after a strong wind (strong wind) pushes the blades, the kinetic energy is used to drive the magnetic rotating mechanism to start rotating. As long as there is intermittent small wind (weak wind). It may be enough to keep the blades from stopping until the next big wind (strong wind) arrives.

Other objects, advantages and novel features of the Invention will become more apparent from the following detailed description when taken in conjunction with the accompanying drawings.

IN THE DRAWINGS

Figure 1:
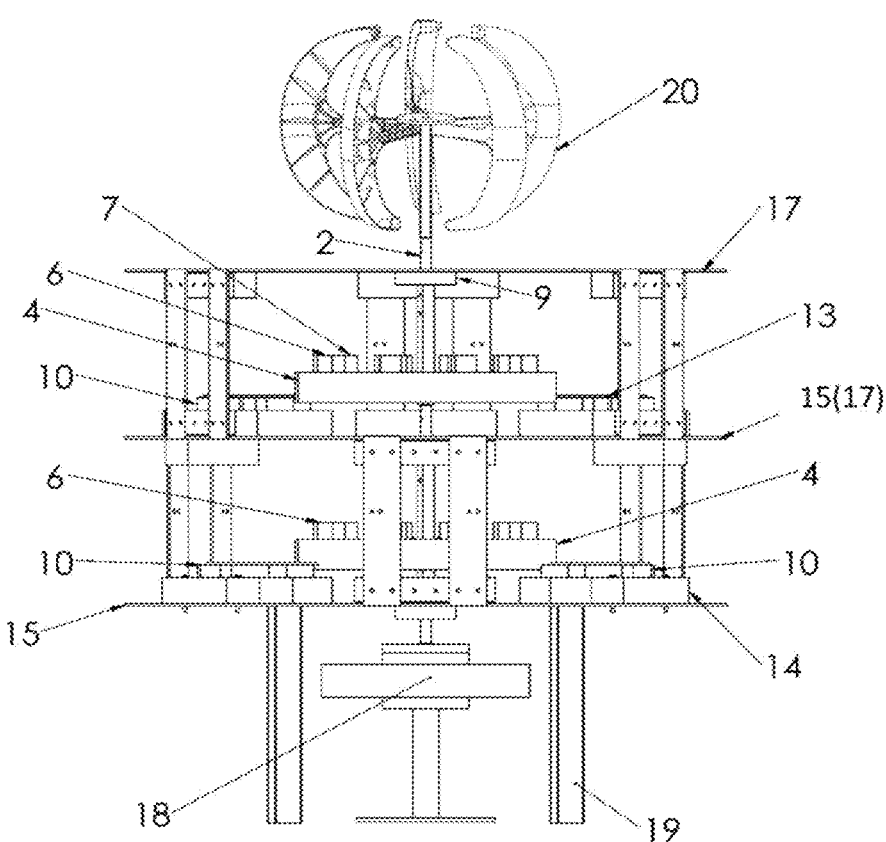
FIG. 1 is a side view of a magnetic rotating mechanism in accordance with the present Invention connected with blades and a generator.

With reference to FIG. 1, a magnetic rotating mechanism in accordance with the present invention comprises at least one layer of layer structure. Preferably, two layers of layer structures are shown in the specification. Each layer of layer structure comprises two rotating arms 4, two securing bases 14, a rotating axle 2, a top board 17 and a bottom board 15.

The axles 2 of the two layers of the layer structure can be connected securely with each other. Alternatively, the rotating axles 2 of the two layers of the layer structure can be formed as a single peace. When the axis of the axles 2 is parallel with ground (vertical to the gravity direction), all of the permanent magnets have to be held securely on the rotating arms 4 or the securing bases 14.

The materials for the mechanism in accordance with the present invention including bolts are not attracted by magnets, such as non-magnetic stainless steel (SUS 304), aluminum alloy, or plastic material to prevent interference with the rotation of the permanent magnets (to cause rotational resistance) or interference with the assembling process.

Although, a large permanent magnet has a strong magnetic force and hands of an worker are easily pinched by two magnets with different magnetic poles N-S, the worker can easily finish the assembling process with wearing two layers of gloves or spacing the magnets with Styrofoam due to two adjacent permanent magnets have the same magnetic pole N-N or S-S.

Figure 2:
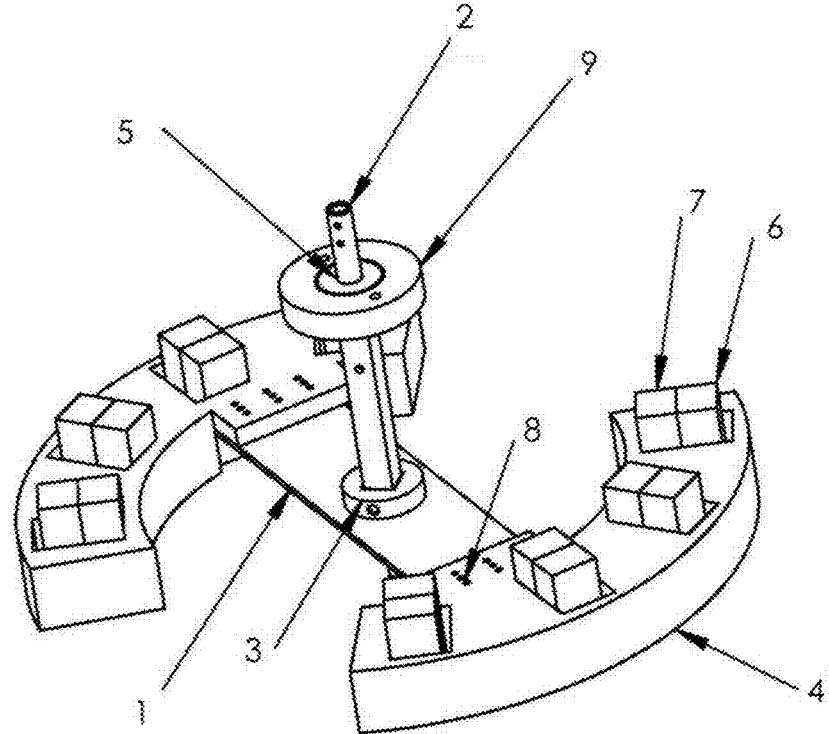
FIG. 2 is an enlarged perspective view of a rotation assembly of the magnetic rotating mechanism in FIG. 1.

With reference further to FIG. 2, two bearings 5 are mounted respectively around two ends of the axle 2 and mounted respectively in two bearing mounts 9. A connection board 1 is mounted securely on the axle 2 at a specific high of the axle 2. Two support rings 3 are disposed respectively at two sides of the connection board 1, and they are mounted securely around the axle 2 with bolts in order to clamp the connection board 1. In addition, one or two gasket can be placed between each holding collar 3 and the connection board 1 to keep the connection board 1 from moving upward or downward or swinging by the magnetic force while rotation.

The rotating arms 4 are securely connected respectively with two ends of the connection board 1 by bolts screwed with threaded holes 8 in the connection board 1. Each rotation arm 4 has four cavities for holding four permanent magnets respectively. The magnetic pole directions of the all eight permanent magnets as shown in the figure are all parallel to the diameter direction of the rotating circle. The magnetic poles N 6 of the permanent magnets held in the cavities face to the securing bases 14, and the magnetic poles S 7 of the permanent magnets held in the cavities face to the axle 2.

Preferably, the arrangement range of the four permanent magnets on each rotating arm 4 is smaller than 120°.

Preferably, the four permanent magnets on each rotating arm 4 are spaced at even intervals and arranged as an arc-shaped.

Preferably, one or two gasket is disposed in a gap between each permanent magnet and a corresponding cavity to prevent the permanent magnet in the cavity to shake by the magnet force while rotating.

The aforementioned manner is an example for holding the permanent magnet in position. In another example, a pressing board is mounted securely on each rotating arm 4 to hold the permanent magnets in the cavities. Alternatively, the pressure plate can also be slid into the slide rails located in the rotating arm 4, and then the pressure plate and the rotating arm can be fixed with bolts.

Figure 3:
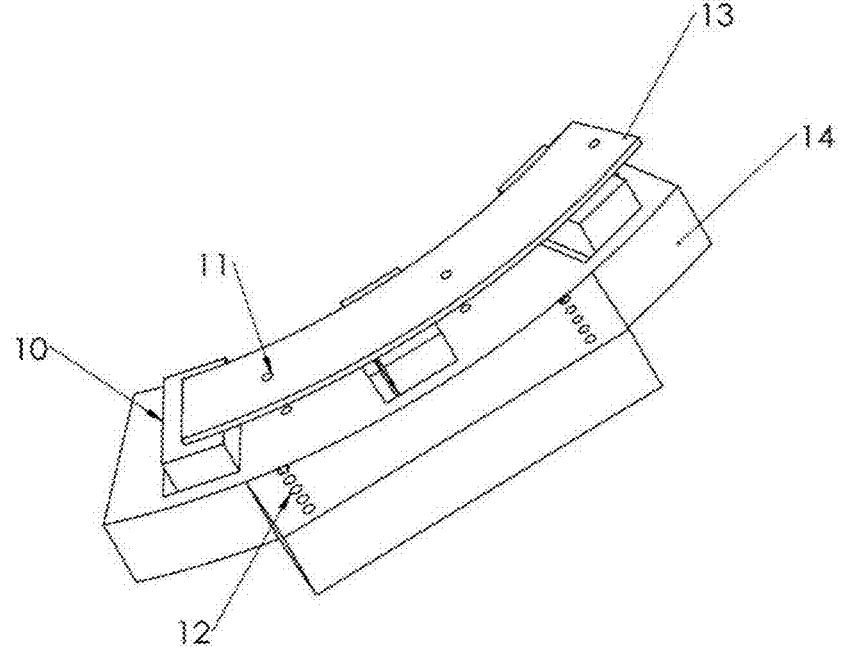
FIG. 3 is an enlarged perspective view of a securing base of the magnetic rotating mechanism in FIG. 1.

With reference further to FIG. 3, the securing bases 14 are arranged around the rotating arms 4. Each securing base 14 has three cavities for holding three permanent magnets therein respectively. The magnetic pole directions of the permanent magnets on the securing bases 14 are all parallel with an axle direction of the rotating axle 2. The magnetic pole N of each permanent magnet in the cavity of the securing base 14 faces a upper side of the securing base 14, and the magnetic pole S of each permanent magnet in the cavity of the securing base 14 faces a lower side of the securing base 14.

Preferably, the arrangement angle range of the three permanent magnets on each securing base 14 is smaller than 60°.

Preferably, the three permanent magnets on each securing base 14 are spaced at even intervals and arranged as an arc-shaped.

To keep the permanent magnet in the cavity from shaking or form escaping from the cavity by the magnet force while rotating, a pressing board 13 is placed onto the permanent magnets to hold the permanent magnets in the cavities of each securing base 14. Bolts are mounted through securing holes 11 defined in the pressing board 13 and are mounted through the securing base 14 then is screwed with nuts. The way for holding the permanent magnets in position is not limited in the present invention.

Multiple through holes 12 are defined through a protrusion formed on an outer side of each securing base 14 for holding the securing base 14 on the bottom board 15 to keep the securing base 14 from being moved or lifted up by the magnetic force while rotating.

Figure 4:
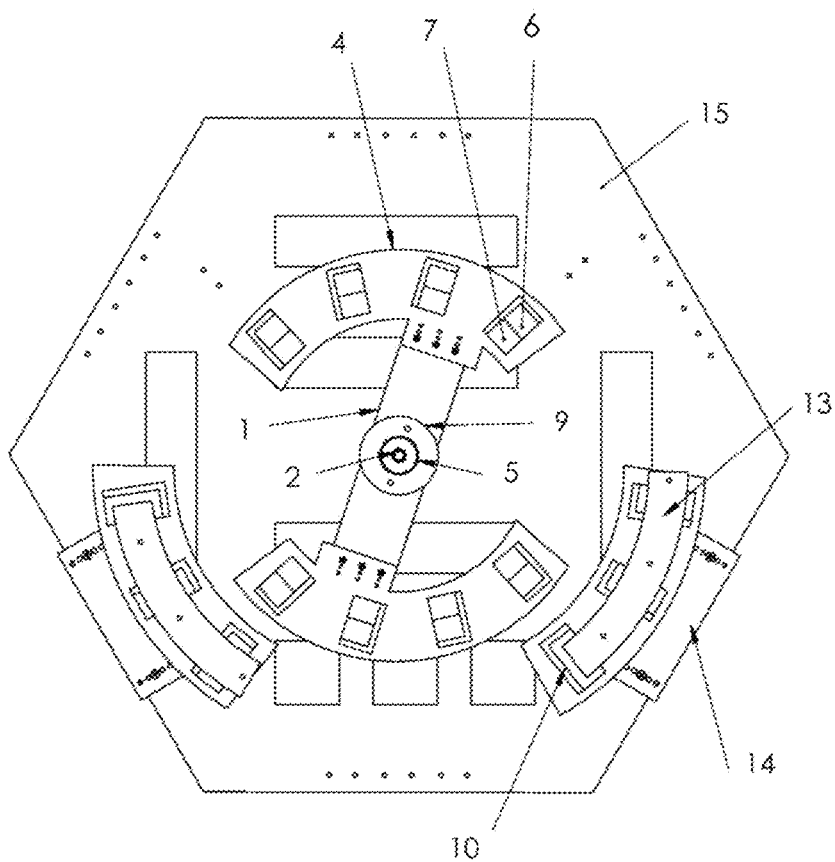
FIG. 4 is a top view of a lower layer of layer structure of the magnetic rotating mechanism in FIG. 1.

With further reference to FIG. 4, in a lower layer of the layer structure, the bottom board 15 is a hexagonal board and the top side of the bottom board 15 is defined as 0°, each side of the bottom board 15 has six threaded holes defined in each side of the bottom board 15 at an interval 60° in clockwise. The threaded holes are applied to hold the securing bases 14 in position. The securing bases 14 in a lower layer are held respectively on the positions at 120° and 240°. Preferably, the arrangement angle range of the securing bases 14 in the lower layer is not beyond the lower half of the bottom board 15.

When the four permanent magnets on one of the rotating arms 4 are located between permanent magnets on the two securing bases 14, a right side line of a left most one of permanent magnets on a rotating arm 4 is aligned with a central line of a right most one of permanent magnets on a securing base 14. A left side line of a right most one of permanent magnets on a rotating arm 4 is aligned with a central line of a left most one of permanent magnets on the other securing base 14.

The aforementioned example is only a prefer example.

A rotation assembly is disposed on a central portion of the bottom board 15 and comprises two rotating arms 4 are diametrically mirrored with each other.

Preferably, the most near horizontal distance between the permanent magnets on the rotating arm 4 and the permanent magnets on the securing base 14 of each layer is larger than the distance between the N-S poles of the permanent magnets on the rotating arm 4.

In this embodiment, the size of each permanent magnet on the rotating arm 4 is 50×25×40 mm, and the size of each permanent magnet on the securing base 14 is 50×25×40 mm. the area of the pole face of all of the permanent magnet is 50×25 mm. If the nearest horizontal distance between the permanent magnets on the rotating arms 4 and the permanent magnets on the securing base 14 is 43 mm, and the distance between the pole faces of the magnetic pole N to S is 40 mm so that 43 mm>40 mm.

Figure 5:
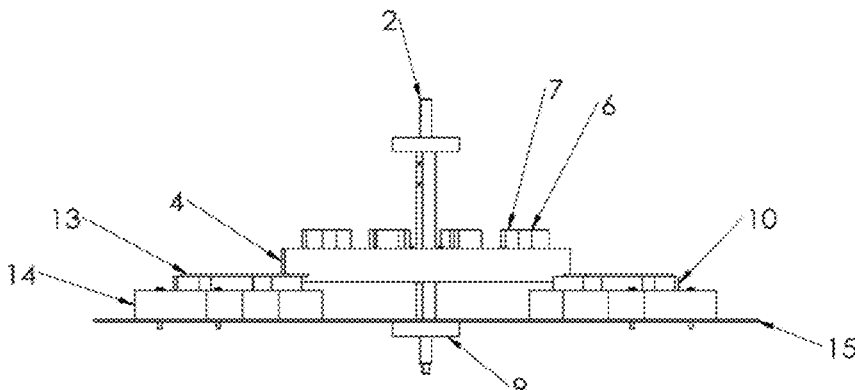
FIG. 5 is a side view of the lower layer of layer structure of the magnetic rotating mechanism in FIG. 4.

With further reference to FIG. 5, two securing bases 14 are mounted securely on the bottom board 15. Three permanent magnets are mounted in cavities in each securing base 14. The magnetic poles N 10 of the six permanent magnets of securing bases 14 are near to the magnetic poles N 6 of the permanent magnet on the rotating arms 4.

A rotation assembly is disposed on a central portion of the bottom board 15 and comprises two rotating arms 4. Four permanent magnets are mounted in cavities in the rotating arm 4. The magnetic poles N 6 of the eight permanent magnets on the rotating arms 4 face to the magnetic pole N 10 of the permanent magnets on the securing bases 14. The magnetic poles S 7 of the eight permanent magnets on the rotating arms 4 face to the rotating axle 2.

The aforementioned is only an example and is not to limit that the magnetic poles N 6 of the eight permanent magnets on the rotating arms 4 face to the magnetic pole N 10 of the permanent magnets on the securing bases 14. Alternatively, the magnetic poles S 7 of the eight permanent magnets on the rotating arms 4 face to the magnetic pole S of the permanent magnets on the securing bases 14.

Preferably, a bottom surface (viewed parallel to the axis of rotation) of each permanent magnet on each one of the rotating arms 4 is higher than a top surface (viewed parallel to the axis of rotation) of each permanent magnet on each one of the securing base 14 of a same layer of the layer structure.

The aforementioned is only an example and is not to limit. Alternatively, a top surface (viewed parallel to the axis of rotation) of each permanent magnet on each one of the rotating arms 4 is lower than a bottom surface (viewed parallel to the axis of rotation) of each permanent magnet on each one of the securing base 14 of a same layer of the layer structure.

Figure 6:
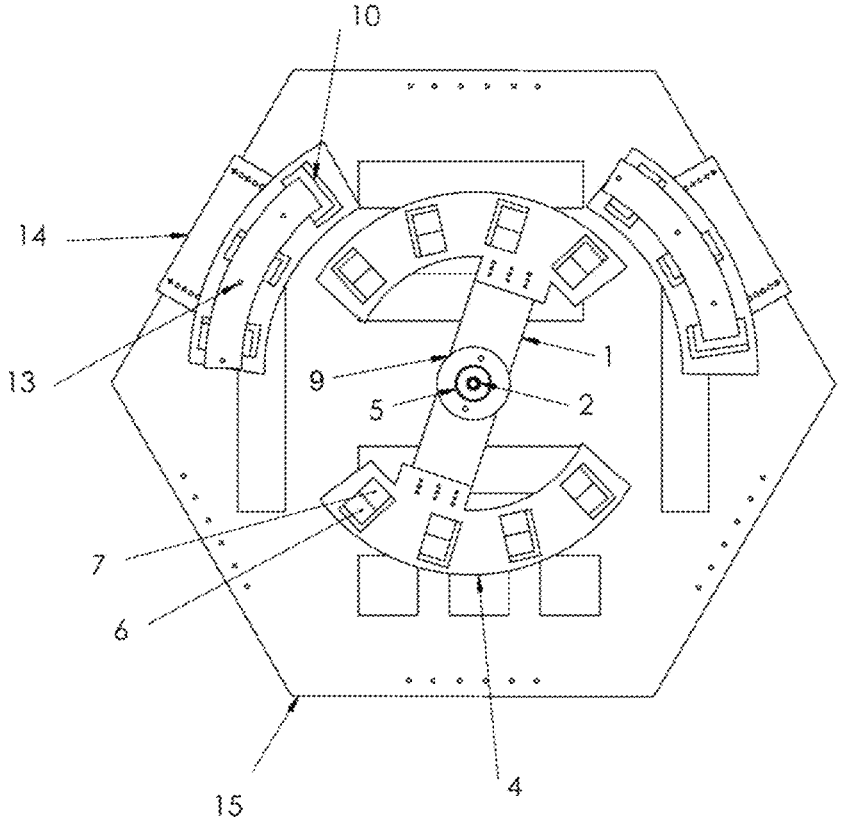
FIG. 6 is a top view of an upper layer of layer structure of the magnetic rotating mechanism in FIG. 1.

With reference to FIG. 6, in an upper layer of the layer structure, the bottom board 15 is a hexagonal board and the top side of the bottom board 15 is defined as 0°, each side of the bottom board 15 has six threaded holes defined in each side of the bottom board 15 at an interval 60° in clockwise. The threaded holes are used to hold the securing bases 14 in position. The securing bases 14 in a higher layer are held respectively on the positions at 60° and 300°. Preferably, the arrangement angle range of the securing bases 14 in the higher layer is not beyond the upper half of the bottom board 15.

When the four permanent magnets on one of the rotating arms 4 are located between permanent magnets on the two securing bases 14, a right side line of a left most one of permanent magnets on a rotating arm 4 is aligned with a central line of a right most one of permanent magnets on a securing base 14. A left side line of a right most one of permanent magnets on a rotating arm 4 is aligned with a central line of a left most one of permanent magnets on the other securing base 14.

The aforementioned example is only a prefer example.

A rotation assembly is disposed on a central portion of the bottom board 15 and comprises two rotating arms 4 are diametrically mirrored with each other.

Preferably, the most near horizontal distance between the permanent magnets on the rotating arm 4 and the permanent magnets on the securing base 14 of each layer is larger than the distance between the N-S poles of the permanent magnets on the rotating arm 4.

In this embodiment, the size of each permanent magnet on the rotating arm 4 is 50×25×40 mm, and the size of each permanent magnet on the securing base 14 is 50×25×40 mm. the area of the pole face of all of the permanent magnet is 50×25 mm. If the nearest horizontal distance between the permanent magnets on the rotating arms 4 and the permanent magnets on the securing base 14 is 43 mm, and the distance between the pole faces of the magnetic pole N to S is 40 mm so that 43 mm>40 mm.

With reference to FIG. 1, a main axle of blades 20 is connected with a top end of the rotating axles 2. When the instantaneous wind force drives the blades 20 to start rotating, the rotating axle 2 of the magnetic rotating mechanism is driven to rotate for a while until stop.

In this embodiment, the top boards 17 and the bottom boards 15 are connected securely with each other to keep the boards 17 & 15 from being moved or shaken by magnetic force.

In addition, a bottom board 15 of an upper layer of adjacent two layers of layer structures can be servers as a top board 17 of a lower layer of adjacent two layers of layer structures.

In this embodiment, four stands 19 are mounted with screws securely on a bottom of the bottom board 15 of the lowest layer of layer structures to keep this magnetic rotating mechanism standing firmly and to prevent the mechanism from being shaken or dumped.

In addition, an axle of a low-resistance generator 18 is connected with a bottom end of the axles 2. Three output wires of the generator 18 can be connected electrically with three LED lamps, such that the stability of output of the generator 18 can be observed by the flash of the LED lamps.

However, the number of layers of the layer structures is not limited to two in the present invention. The number of the layers may be one or multiple (4, 6, or 8). Since the rotation of this mechanism is required to have low resistance, the preferred way is to arrange the number of layers to be a multiple of 2. Since the multi-layer structure shares a rotating axles 2, all the rotating arms 4 of each layer structure rotate synchronously.

In practice, the magnetic rotating mechanism can be arranged inside a chassis of a conventional wind power generator between a blade axle and a generating axle.

The instantaneous wind force drives the permanent magnet on the rotating arms 4 to start rotating, which contains magnetic force with the permanent magnets on the securing bases 14. Thus combining the wind force and the magnetic force, the rotation of the wind power generator is more stable and the chance of stop of the wind power generator is lowered.

The magnetic rotating mechanism in accordance with the present invention is not only limited to be applied to a wind power generator, but also can be applied to a hydroelectric power generator or a tidal power generator or a power generation device driven by other intermittent forces.

In addition to the conventional technology where the main shaft of the blade is directly or indirectly (geared) connected to the main shaft of the generator to generate electrical energy, another embodiment of power generation is to arrange multiple sets of coil windings at specific angles on the outer circumference of rotating arm 4 of the magnetic rotating mechanism. These coil windings are cut by the magnetic force lines when the permanent magnets on rotating arm 4 rotates, and then there is output of electrical energy.

The invention claimed is:

1. A magnetic rotating mechanism comprising at least one layer structure, each one of the at least one layer structure having at least one rotating arm (4), at least one securing base (14), a connection board (1), a rotating axle (2), a top board (17), and a bottom board (15), wherein the connection board (1) is located between the top board (17) and the bottom board (15) and connected securely to the rotating axle (2);

the at least one rotating arm (4) is mounted on the connection board (1);

the at least one securing base (14) is mounted on the bottom board (15);

at least one permanent magnet is mounted on each one of the at least one rotating arm (4) and the at least one securing base (14); and the magnetic pole direction of each permanent magnet on each rotating arm (4) is parallel to the diameter direction of the rotating circle, and each permanent magnet on each one of the securing base (14) has a magnetic pole direction parallel with an axle direction of the rotating axle (2).

2. The magnetic rotating mechanism as claimed in claim 1, wherein the magnetic rotating mechanism comprising multiple layers of layer structures, locations of the rotating arms (4) on adjacent two layers of the layer structures are aligned axially with each other; and locations of the securing bases (14) on adjacent two layers of the layer structures are misaligned axially with each other.

3. The magnetic rotating mechanism as claimed in claim 2, wherein arrangement ranges of the permanent magnets on the securing bases (14) of adjacent two layers of the layer structures are free from being overlapped with each other;

a total arrangement angle range of all the at least one permanent magnet on each one of the least one securing base (14) of an upper layer of the adjacent two layers of the layer structures is smaller than 180°; and a total arrangement range of all the at least one permanent magnet on each one of the least one securing base (14) of a lower layer of the adjacent two layers of the layer structures is smaller than 180°.

4. The magnetic rotating mechanism as claimed in claim 2, wherein each layer of the layer structures is implemented as when there plural of securing bases (14) on the same layer, each securing base (14) spaced from each other and is free from being connected with each other.

5. The magnetic rotating mechanism as claimed in claim 2, wherein each layer of the layer structures is implemented as when there are plural of rotating arms (4) on the same layer, each rotating arm (4) spaced from each other and is free from being connected with each other, and the permanent magnets on the different rotating arms (4) are diametrically mirrored with each other.

6. The magnetic rotating mechanism as claimed in claim 2, wherein multiple permanent magnets are mounted on each one of the rotating arms (4) and the securing bases (14); and the multiple permanent magnets on each one of the rotating arms (4) and the securing bases (14) are arranged as an arc-shape at even spaced intervals.

7. The magnetic rotating mechanism as claimed in claim 6, wherein a bottom surface (viewed parallel to the axis of rotation) of each permanent magnet on each one of the rotating arms (4) is higher than a top surface (viewed parallel to the axis of rotation) of each permanent magnet on each one of the securing base (14) of a same layer of the layer structure.

8. The magnetic rotating mechanism as claimed in claim 6, wherein a most near horizontal distance between the permanent magnets on the at least one rotating arm (4) and the permanent magnets on the at least one securing base (14) of each layer of the layer structures is larger than a distance between the N-S poles of the permanent magnets on the rotating arm (4).

9. The magnetic rotating mechanism as claimed in claim 6, wherein when one of the rotating arms (4) is located between the two securing base (14) of same layer of the layer structures, a right side line of a left most one of permanent magnets on a rotating arm (4) is aligned with a central line of a right most one of permanent magnets on a securing base (14); and a left side line of a right most one of permanent magnets on a rotating arm (4) is aligned with a central line of a left most one of permanent magnets on the other securing base (14).

\* \* \* \* \*